(12) United States Patent
Tang (10) Patent No.: US 10,973,039 B2
(45) Date of Patent: Apr. 6, 2021

(54) METHOD FOR DATA TRANSMISSION AND TERMINAL

(71) Applicant: Guangdong Oppo Mobile Telecommunications Corp., Ltd., Guangdong (CN)

(72) Inventor: Rongzheng Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/255,000

(22) Filed: Jan. 23, 2019

(65) Prior Publication Data
US 2019/0159225 A1   May 23, 2019

Related U.S. Application Data

(63) Continuation of application No. PCT/CN2017/099192, filed on Aug. 26, 2017.

(30) Foreign Application Priority Data

Dec. 7, 2016 (CN) .......................... 201611117010.9

(51) Int. Cl.
*H04L 1/18* (2006.01)
*H04W 72/12* (2009.01)
(Continued)

(52) U.S. Cl.
CPC ....... *H04W 72/1242* (2013.01); *H04L 1/1854* (2013.01); *H04W 28/0289* (2013.01);
(Continued)

(58) Field of Classification Search
None
See application file for complete search history.

(56) References Cited

U.S. PATENT DOCUMENTS

2008/0043651 A1   2/2008 Okamoto et al.
2014/0219112 A1*  8/2014 Kherani ............ H04W 72/1242
                                                        370/252
(Continued)

FOREIGN PATENT DOCUMENTS

CN        101047481 A      10/2007
CN        101809959 A       8/2010
(Continued)

OTHER PUBLICATIONS

Extended European search report issued in corresponding European application No. 17879080.4 dated Sep. 17, 2019.
(Continued)

*Primary Examiner* — Ayaz R Sheikh
*Assistant Examiner* — Sori A Aga (57) ABSTRACT

A method for data transmission and a terminal are provided. The method includes the following. An acknowledgment message for indicating successful data reception is generated in response to first downlink data received by a terminal. The acknowledgment message is transmitted via a preset channel resource when a channel resource occupancy priority of the acknowledgment message is higher than a channel resource occupancy priority of second downlink data to be received by the terminal.

6 Claims, 7 Drawing Sheets

(51) Int. Cl.
*H04W 28/04* (2009.01)
*H04W 28/06* (2009.01)
*H04W 28/02* (2009.01)
*H04W 72/10* (2009.01)
*H04L 1/16* (2006.01)
*H04W 84/12* (2009.01)

(52) U.S. Cl.
CPC ........... *H04W 28/04* (2013.01); *H04W 28/06* (2013.01); *H04W 72/10* (2013.01); *H04L 1/16* (2013.01); *H04W 84/12* (2013.01)

(56) References Cited

U.S. PATENT DOCUMENTS

2016/0330011 A1* 11/2016 Lee .................. H04L 5/006
2018/0092111 A1* 3/2018 Chaudhuri ............ H04L 5/0048

FOREIGN PATENT DOCUMENTS

| CN | 101964974 A | 2/2011 |
|---|---|---|
| CN | 102036383 A | 4/2011 |
| CN | 102984101 A | 3/2013 |
| CN | 103582134 A | 2/2014 |
| CN | 103795645 A | 5/2014 |

OTHER PUBLICATIONS

Renesas Mobile Europe: "Operation Principles of CC specific TDD Configuration" 3GPP Draft: R2-112938 Operation Principles for CC Specific TDD Configuration, 3RDGENERATION Partnership Project (3GPP), Mobile Competence Centre: 650, Route Deslucioles: F-06921 Sophia-Antipolis Cedex; France vol. RAN WG2, No. Barcelona, Spain; May 9, 2011, May 2, 2011 (May 2, 2011), XP050495150.

IPWIRELESS: "QoS/Policy Signalling and eNode-B IP Aware Scheduling Strategies", 3GPP Draft R3-061682. 3rd Generation Partnership Project (3GPP). Mobilecompetence Centre: 650, Route Deslucioles : F-06921 Sophia-Antipolis Cedex: France, vol. RAN WG3, No. Riga, Latvia; Nov. 1, 2006, Nov. 1, 2006 (Nov. 1, 2006), XP050160584.

International search report issued in corresponding international application No. PCT/CN20171099192 dated Oct. 27, 2017.

First examination report issued in corresponding IN application No. 201917008123 dated Sep. 9, 2020.

* cited by examiner

METHOD FOR DATA TRANSMISSION AND TERMINAL

CROSS-REFERENCE TO RELATED APPLICATION(S)

This application is a continuation of International Application No. PCT/CN2017/099192, filed on Aug. 26, 2017, which claims priority to Chinese Patent Application No. 201611117010.9, filed on Dec. 7, 2016, the disclosures of both of which are hereby incorporated by reference in their entirety.

TECHNICAL FIELD

The present disclosure relates to the technical field of terminals, and more particularly to a method for data transmission and a terminal.

BACKGROUND

Figure 1:
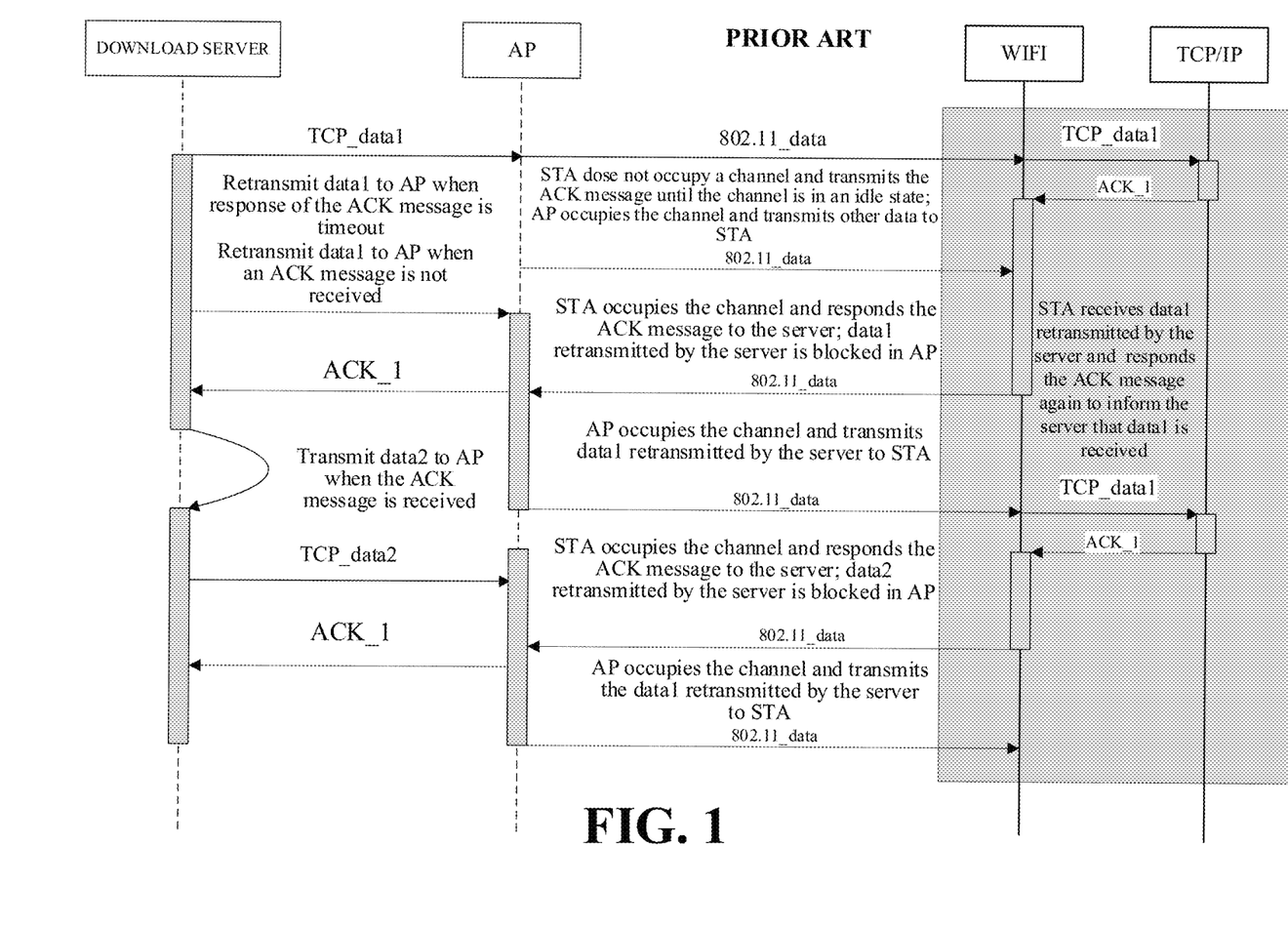
FIG. 1 is a flow chart illustrating data transmission in the related art.

With the development of mobile communication technology and the popularity of wireless fidelity (Wi-Fi) technology, users are accustomed to downloading or watching videos from the Internet via Wi-Fi. As illustrated in FIG. 1, in application scenarios in which a video resource is downloaded via Wi-Fi, a mobile terminal, in other words, a station (STA) is mainly configured to receive rather than transmit data, and the time that the STA occupies a channel to transmit data is short. However, a wireless router, in other words, an access point (AP) is mainly configured to transmit data, so the time that the AP occupies the channel to transmit data is long. After transmitting a data frame, the AP usually has other data frames waiting to be transmitted. After receiving the data frame transmitted by the AP, the STA transmits an acknowledgement (ACK) message frame to the AP, leading to channel competition between the AP and the STA.

SUMMARY

In a first aspect, a method for data transmission is provided according to embodiments of the present disclosure. The method includes the following.

An acknowledgment message for indicating successful data reception is generated in response to first downlink data received by a terminal. The acknowledgment message is transmitted via a preset channel resource when a channel resource occupancy priority of the acknowledgment message is higher than a channel resource occupancy priority of second downlink data to be received by the terminal.

In a second aspect, a terminal is provided according to embodiments of the present disclosure. The terminal includes at least one processor and a computer readable storage. The computer readable storage is coupled to the at least one processor and stores at least one computer executable instruction thereon which, when executed by the at least one processor, causes the at least one processor to carry out actions, including: generating an acknowledgment message for indicating successful data reception in response to first downlink data received by a terminal; transmitting the acknowledgment message via a preset channel resource, when a channel resource occupancy priority of the acknowledgment message is higher than a channel resource occupancy priority of second downlink data to be received by the terminal.

In a third aspect, a non-transitory computer-readable storage medium is provided according to embodiments of the present disclosure. The non-transitory computer-readable storage medium is configured to store a computer program which, when executed by a processor, cause the processor to carry out following actions: generating an acknowledgment message for indicating successful data reception in response to first downlink data received by a terminal; transmitting the acknowledgment message via a preset channel resource, when a channel resource occupancy priority of the acknowledgment message is higher than a channel resource occupancy priority of second downlink data to be received by the terminal.

BRIEF DESCRIPTION OF DRAWINGS

To illustrate the technical solutions embodied by the embodiments of the present disclosure more clearly, the following briefly introduces the accompanying drawings required for describing the embodiments. Apparently, the accompanying drawings in the following description merely illustrate some embodiments of the present disclosure. Those of ordinary skill in the art may also obtain other drawings based on these accompanying drawings without creative efforts.

DETAILED DESCRIPTION

Technical solutions in embodiments of the present disclosure will be described clearly and completely hereinafter with reference to the accompanying drawings in the embodiments of the present disclosure for those skilled in the art to better understand the scheme of the present disclosure. Apparently, the described embodiments are merely some rather than all embodiments of the present disclosure. All other embodiments obtained by those of ordinary skill in the art based on the embodiments of the present disclosure without creative efforts shall fall within the protection scope of the present disclosure.

In the related art, channel resource occupancy priorities of a station (STA) and an access point (AP) are the same. Therefore, the AP has the same chance to compete for a channel resource as the STA. When acquiring the channel resource, the AP continues to transmit a data frame. The data frame is much larger than an ACK message frame, and it takes a long time for the AP to occupy the channel to transmit the data frame. The STA has to wait longer to get a chance to compete for the channel. When the AP does not receive an ACK message from the STA for a period of time, the AP will attempt to retransmit a last data frame, which leads to a fiercer channel resource competition, a more serious congestion in network communication, and an increasing probability of AP retransmission, thereby resulting in a slower download speed.

According to a method for data transmission provided in the embodiments of the present disclosure, a terminal generates an acknowledgment message for indicating successful data reception in response to first downlink data received. The terminal acquires a channel resource occupancy priority of the acknowledgment message, and transmits the acknowledgment message via a preset channel resource when the channel resource occupancy priority of the acknowledgment message is higher than a channel resource occupancy priority of second downlink data. The second downlink data is data to be received by the terminal. It can be seen that, the terminal detects whether the channel resource occupancy priority of the acknowledgment message is higher than the channel resource occupancy priority of second downlink data, and transmits the acknowledgment message via the preset channel resource when the channel resource occupancy priority of the acknowledgment message is higher than the channel resource occupancy priority of second downlink data, which is beneficial to facilitating improving a speed of transmitting the ACK message, thereby alleviating a congestion of the network communication, reducing a probability of the AP retransmission, and improving a Wi-Fi download speed.

In order to better understand the method for data transmission and a terminal provided in embodiments of the present disclosure, the embodiments of the present disclosure are described in detail below.

Figure 2:
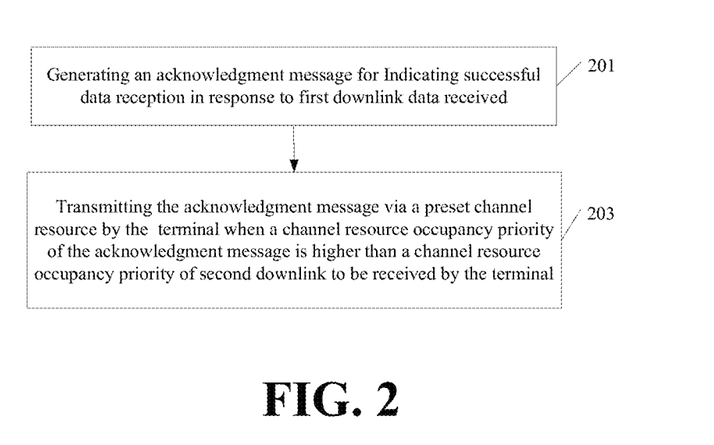
FIG. 2 is a flow chart illustrating a method for data transmission according to an embodiment of the present disclosure.

Refer to FIG. 2, which illustrates a method for data transmission according to an embodiment of the present disclosure. As illustrated in FIG. 2, the method includes the following.

At block 201, a terminal generates an acknowledgment message for indicating successful data reception in response to first downlink data received.

At block 202, the terminal transmits the acknowledgment message via a preset channel resource when a channel resource occupancy priority of the acknowledgment message is higher than a channel resource occupancy priority of second downlink data to be received by the terminal.

Figure 3:
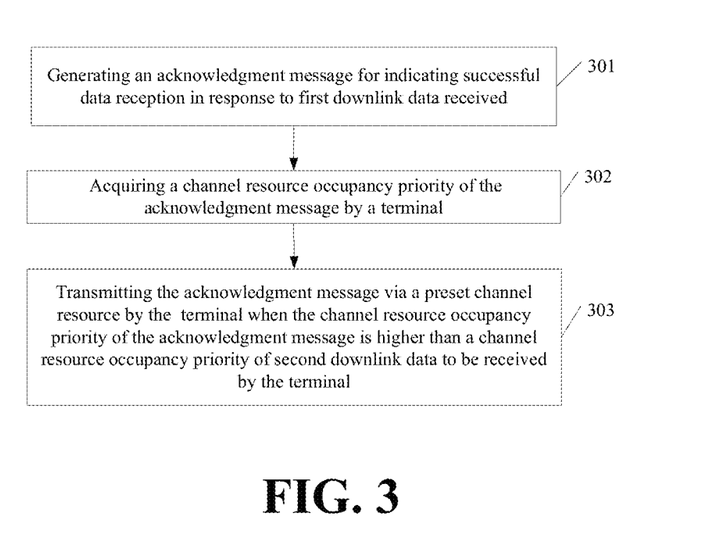
FIG. 3 is a flow chart illustrating a method for data transmission according to an embodiment of the present disclosure.

Refer to FIG. 3, which illustrates a method for data transmission according to an embodiment of the present disclosure. As illustrated in FIG. 3, the method includes the following.

At block 301, a terminal generates an acknowledgment message for indicating successful data reception in response to first downlink data received.

The terminal includes, but is not limited to, a smart phone, a tablet computer, a notebook computer, a personal digital assistant, and the like, and further includes a non-terminal such as a desktop computer.

At block 302, the terminal acquires a channel resource occupancy priority of the acknowledgment message.

The terminal will detect a status of a current channel before transmitting data through a Wi-Fi network. The terminal may delay accessing a medium when the current channel is in a busy status and select an additional waiting time. The terminal will not transmit the data until the medium is idle again. The length of the waiting time is determined according to the type of the data to be transmitted. In order to improve an access bandwidth and reduce a delay of a high-priority communication, the quality-of-service (QOS) of the wireless local area network is defined in the Institute of Electrical and Electronic Engineers (IEEE) 802.11e. In this way, high-priority data can gain access to an internet in most cases. The high-priority data waits for a shorter time when the medium is busy. Therefore, when waiting to be transmitted, the high-priority data may occupy the medium before low-priority data frames attempt to access the medium.

At block 303, the terminal transmits the acknowledgment message via a preset channel resource when the channel resource occupancy priority of the acknowledgment message is higher than a channel resource occupancy priority of second downlink data to be received by the terminal.

Figure 4:
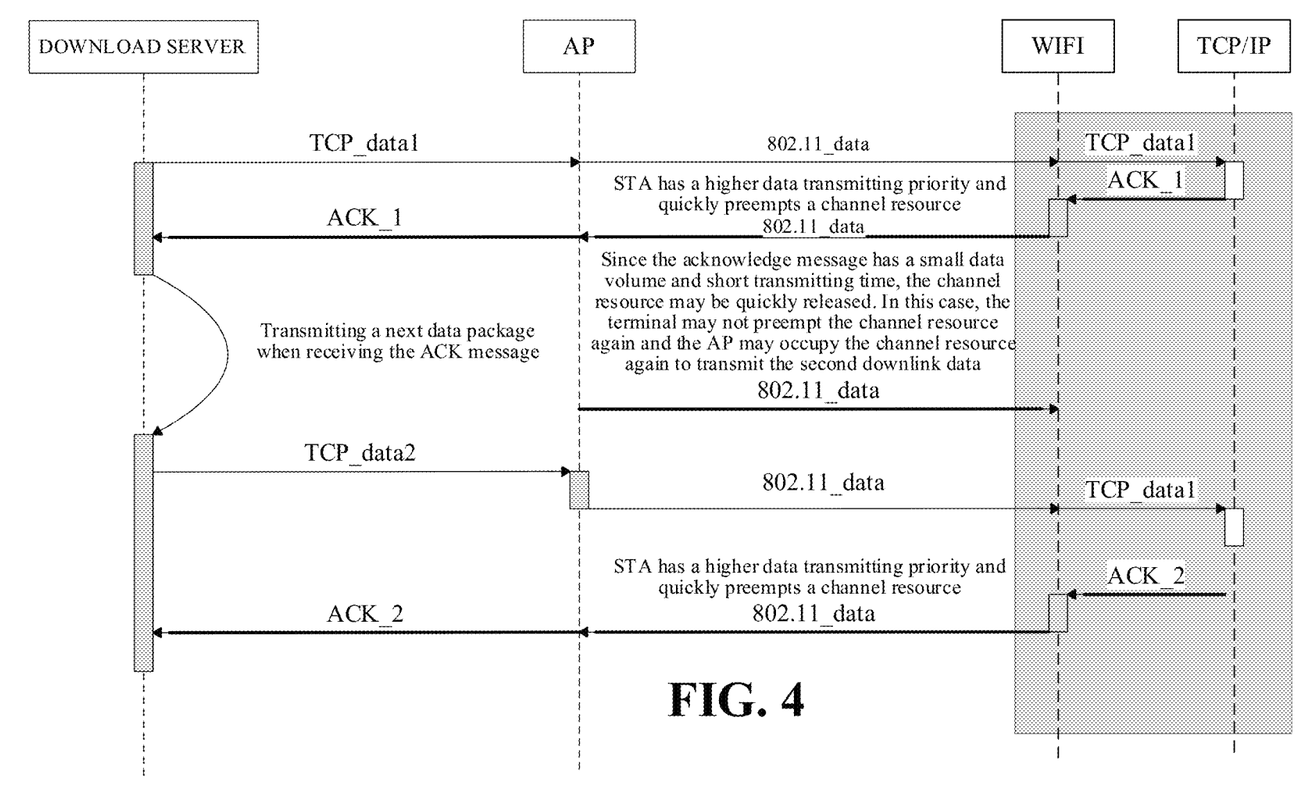
FIG. 4 is a flow chart illustrating a method for data transmission according to another embodiment of the present disclosure.

As illustrated in FIG. 4, when the channel resource occupancy priority of the acknowledgment message is higher than the channel resource occupancy priority of second downlink data, the terminal quickly preempts a channel resource. Since the acknowledge message has a small data volume and short transmitting time, the channel resource may be quickly released. In this case, the terminal will not compete for the channel resource again and the AP may occupy the channel resource again to transmit the second downlink data.

According to the method for data transmission provided in the embodiment of the present disclosure, the terminal generates the acknowledgment message in response to the first downlink data received. The terminal acquires the channel resource occupancy priority of the acknowledgment message, and transmits the acknowledgment message via the preset channel resource when the channel resource occupancy priority of the acknowledgment message is higher than the channel resource occupancy priority of the second downlink data. The second downlink data is the data to be received by the terminal. It can be seen that, the terminal detects whether the channel resource occupancy priority of the acknowledgment message is higher than the channel resource occupancy priority of the second downlink data, and transmits the acknowledgment message via the preset channel resource when the channel resource occupancy priority of the acknowledgment message is higher than the channel resource occupancy priority of the second downlink data, which is beneficial to facilitating improving a speed of transmitting the ACK message, thereby alleviating a congestion of the network communication, reducing a probability of the AP retransmission, and improving a Wi-Fi download speed.

In the illustrated embodiment, after generating the acknowledgment message and prior to acquiring the channel resource occupancy priority of the acknowledgment message, the terminal further implements the following.

The terminal sets the channel resource occupancy priority of the acknowledgment message to be higher than the channel resource occupancy priority of the second downlink data when a downlink-data-receiving speed of the terminal is higher than an uplink-data-transmitting speed of the terminal.

In the illustrated embodiment, after generating the acknowledgment message and prior to acquiring the channel resource occupancy priority of the acknowledgment message, the terminal further implements the following.

The terminal sets the channel resource occupancy priority of the acknowledgment message to be higher than the channel resource occupancy priority of the second downlink data when a difference value between a downlink-data-receiving speed of the terminal and an uplink-data-transmitting speed of the terminal is greater than (that is, exceed) or equal to a first preset threshold.

In the illustrated embodiment, after generating the acknowledgment message and prior to acquiring the channel resource occupancy priority of the acknowledgment message, the terminal further implements the following.

The terminal sets the channel resource occupancy priority of the acknowledgment message to be higher than the channel resource occupancy priority of the second downlink data, when the amount of downlink data received by the terminal during a preset time period is greater than or equal to a second preset threshold.

In the illustrated embodiment, after generating the acknowledgment message and prior to acquiring the channel resource occupancy priority of the acknowledgment message, the terminal further implements the following.

The terminal sets the channel resource occupancy priority of the acknowledgment message to be higher than the channel resource occupancy priority of the second downlink data, when the amount of uplink data transmitted by the terminal during a preset time period is less than or equal to a third preset threshold.

Figure 5:
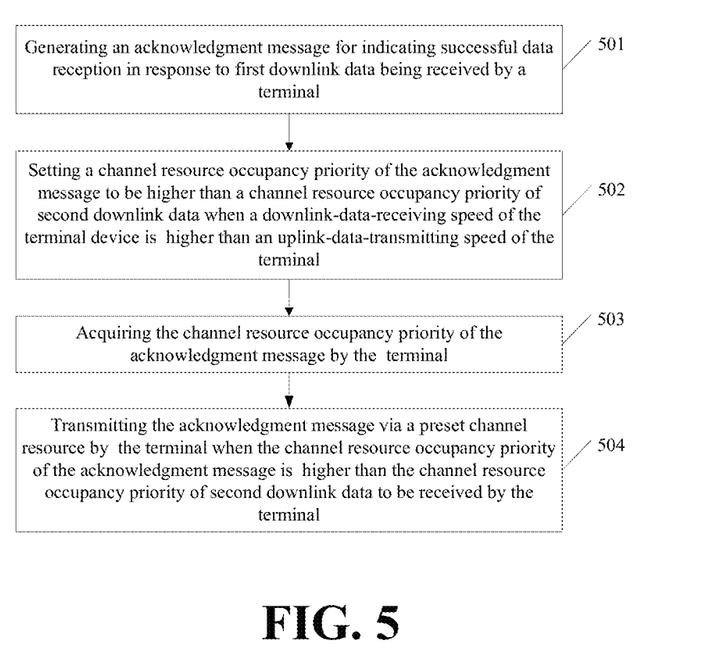
FIG. 5 is a flow chart illustrating a method for data transmission according to another embodiment of the present disclosure.

Referring to FIG. 5, which is a flow chart illustrating a method for data transmission according to another embodiment of the present disclosure, the method includes the following.

At block 501, a terminal generates an acknowledgment message for indicating successful data reception in response to first downlink data received by a terminal.

At block 502, the terminal sets a channel resource occupancy priority of the acknowledgment message to be higher than a channel resource occupancy priority of second downlink data, when a downlink-data-receiving speed of the terminal is higher than an uplink-data-transmitting speed of the terminal.

At block 503, the terminal acquires the channel resource occupancy priority of the acknowledgment message.

At block 504, the terminal transmits the acknowledgment message via a preset channel resource when the channel resource occupancy priority of the acknowledgment message is higher than the channel resource occupancy priority of second downlink data. The second downlink data is data to be received by the terminal.

According to the method for data transmission provided in the embodiment of the present disclosure, the terminal generates the acknowledgment message in response to the first downlink data received. The terminal sets the channel resource occupancy priority of the acknowledgment message to be higher than the channel resource occupancy priority of the second downlink data, when the downlink-data-receiving speed of the terminal is higher than the uplink-data-transmitting speed of the terminal. The terminal transmits the acknowledgment message via the preset channel resource. The second downlink data is data to be received by the terminal. It can be seen that, the terminal sets the channel resource occupancy priority of the acknowledgment message to be higher than the channel resource occupancy priority of the second downlink data when the downlink-data-receiving speed of the terminal is higher than an uplink-data-transmitting speed of the terminal and transmits the acknowledgment message via the preset channel resource, which can facilitate improving a speed of transmitting the ACK message, thereby alleviating a congestion of the network communication, reducing a probability of the AP retransmission, and improving a Wi-Fi download speed.

Figure 6:
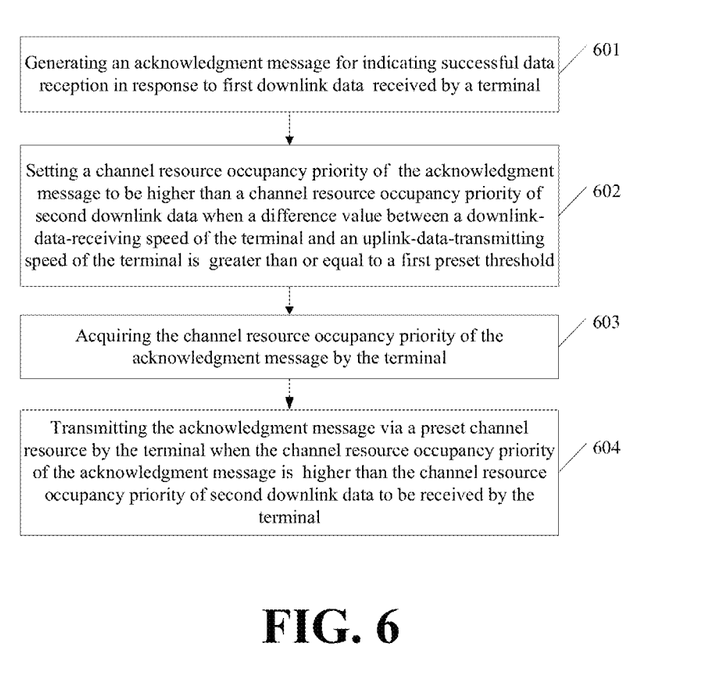
FIG. 6 is a flow chart illustrating a method for data transmission according to another embodiment of the present disclosure.

Referring to FIG. 6, which is a flow chart illustrating a method for data transmission according to another embodiment of the present disclosure, the method includes the following.

At block 601, a terminal generates an acknowledgment message for indicating successful data reception in response to first downlink data received by a terminal.

At block 602, the terminal sets a channel resource occupancy priority of the acknowledgment message to be higher than a channel resource occupancy priority of second downlink data, when a difference value between a downlink-data-receiving speed of the terminal and an uplink-data-transmitting speed of the terminal is greater than or equal to a first preset threshold.

At block 603, the terminal acquires the channel resource occupancy priority of the acknowledgment message.

At block 604, the terminal transmits the acknowledgment message via a preset channel resource when the channel resource occupancy priority of the acknowledgment message is higher than the channel resource occupancy priority of second downlink data. The second downlink data is data to be received by the terminal.

According to the method for data transmission provided by the embodiment of the present disclosure, the terminal generates the acknowledgment message in response to the first downlink data received. The terminal sets the channel resource occupancy priority of the acknowledgment message to be higher than the channel resource occupancy priority of the second downlink data, when the difference value between the downlink-data-receiving speed of the terminal and the uplink-data-transmitting speed of the terminal is greater than or equal to the first preset threshold. The terminal acquires the channel resource occupancy priority of the acknowledgment message and transmits the acknowledgment message via the preset channel resource when the channel resource occupancy priority of the acknowledgment message is higher than the channel resource occupancy priority of the second downlink data. The second downlink data is data to be received by the terminal. It can be seen that, the terminal sets the channel resource occupancy priority of the acknowledgment message to be higher than the channel resource occupancy priority of the second downlink data when the difference value between the downlink-data-receiving speed of the terminal and the uplink-data-transmitting speed of the terminal is greater than or equal to a first preset threshold and transmits the acknowledgment message via the preset channel resource, which can facilitate improving a speed of transmitting the ACK message, thereby alleviating a congestion of the network communication, reducing a probability of the AP retransmission, and improving a Wi-Fi download speed.

Figure 7:
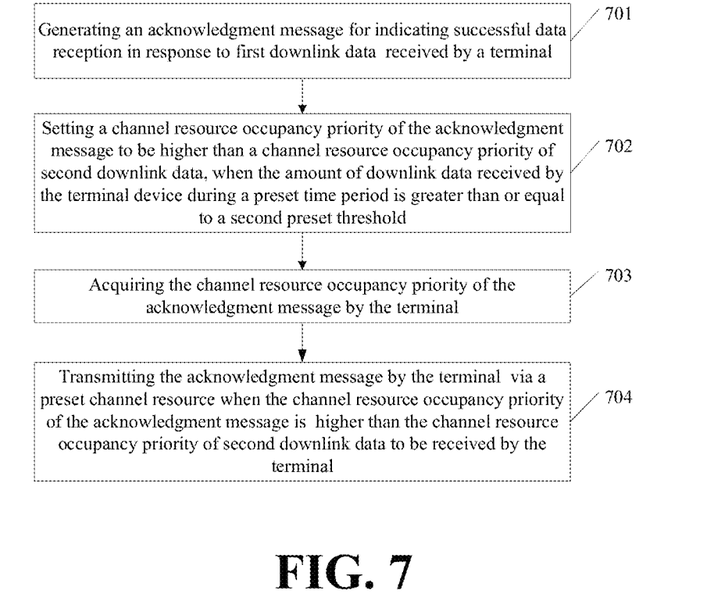
FIG. 7 is a flow chart illustrating a method for data transmission according to another embodiment of the present disclosure.

Referring to FIG. 6, which is a flow chart illustrating a method for data transmission according to another embodiment of the present disclosure, the method includes the following.

At block 701, a terminal generates an acknowledgment message for indicating successful data reception in response to first downlink data received by a terminal.

At block 702, the terminal sets a channel resource occupancy priority of the acknowledgment message to be higher than a channel resource occupancy priority of second downlink data, when the amount of downlink data received by the terminal during a preset time period is greater than or equal to a second preset threshold.

At block 703, the terminal acquires the channel resource occupancy priority of the acknowledgment message.

At block 704, the terminal transmits the acknowledgment message via a preset channel resource when the channel resource occupancy priority of the acknowledgment message is higher than the channel resource occupancy priority of second downlink data. The second downlink data is data to be received by the terminal.

According to the method for data transmission provided by the embodiment of the present disclosure, the terminal generates the acknowledgment message in response to the first downlink data received. The terminal sets the channel resource occupancy priority of the acknowledgment message to be higher than the channel resource occupancy priority of the second downlink data, when the amount of downlink data received by the terminal during a preset time period is greater than or equal to a second preset threshold. The terminal acquires the channel resource occupancy priority of the acknowledgment message and transmits the acknowledgment message via the preset channel resource. The second downlink data is data to be received by the terminal. It can be seen that, the terminal sets the channel resource occupancy priority of the acknowledgment message to be higher than the channel resource occupancy priority of the second downlink data and transmits the acknowledgment message via the preset channel resource, which is beneficial to facilitating improving a speed of transmitting the ACK message, thereby alleviating a congestion of the network communication, reducing a probability of the AP retransmission, and improving a Wi-Fi download speed.

Figure 8:
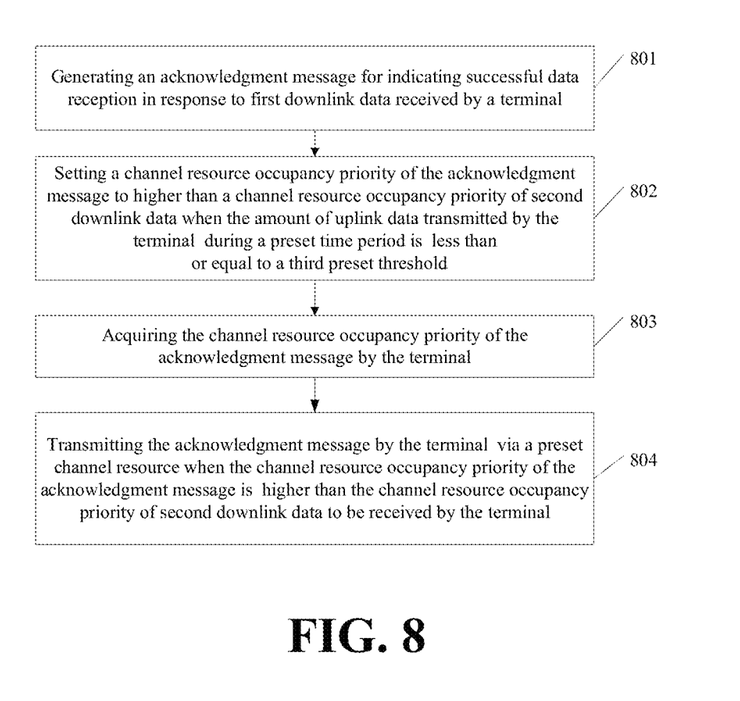
FIG. 8 is a flow chart illustrating a method for data transmission according to another embodiment of the present disclosure.

Referring to FIG. 8, which is a flow chart illustrating a method for data transmission according to another embodiment of the present disclosure, the method includes the following.

At block 801, a terminal generates an acknowledgment message for indicating successful data reception in response to first downlink data received by a terminal.

At block 802, the terminal sets a channel resource occupancy priority of the acknowledgment message to be higher than a channel resource occupancy priority of second downlink data, when the amount of uplink data transmitted by the terminal during a preset time period is less than or equal to a third preset threshold.

At block 803, the terminal acquires the channel resource occupancy priority of the acknowledgment message.

At block 804, the terminal transmits the acknowledgment message via a preset channel resource when the channel resource occupancy priority of the acknowledgment message is higher than the channel resource occupancy priority of second downlink data. The second downlink data is data to be received by the terminal.

According to the method for data transmission provided by the embodiment of the present disclosure, the terminal generates the acknowledgment message in response to the first downlink data received. The terminal sets the channel resource occupancy priority of the acknowledgment message to be higher than the channel resource occupancy priority of the second downlink data, when the amount of the uplink data transmitted by the terminal during the preset time period is less than or equal to the third preset threshold. The terminal acquires the channel resource occupancy priority of the acknowledgment message and transmits the acknowledgment message via the preset channel resource. The second downlink data is data to be received by the terminal. It can be seen that, the terminal sets the channel resource occupancy priority of the acknowledgment message to be higher than the channel resource occupancy priority of the second downlink data and transmits the acknowledgment message via the preset channel resource, which is beneficial to facilitating improving a speed of transmitting the ACK message, thereby alleviating a congestion of the network communication, reducing a probability of the AP retransmission, and improving a Wi-Fi download speed.

Figure 9A:
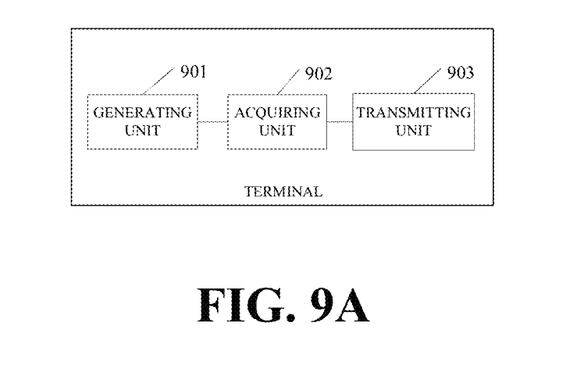
FIG. 9A is a block diagram illustrating a terminal according to an embodiment of the present disclosure.

An apparatus embodiment of the present disclosure is illustrated as follows. The apparatus in the embodiment of the present disclosure is configured to implement the method according to the embodiments of the present disclosure. As illustrated in FIG. 9A, a terminal can include a generating unit 901, an acquiring unit 902, and a transmitting unit 903.

The generating unit 901 is configured to generate an acknowledgment message for indicating successful data reception in response to first downlink data received by a terminal.

The acquiring unit 902 is configured to acquire a channel resource occupancy priority of the acknowledgment message.

The transmitting unit 903 is configured to transmit the acknowledgment message via a preset channel resource when the channel resource occupancy priority of the acknowledgment message is higher than a channel resource occupancy priority of second downlink data to be received by the terminal.

According to the terminal provided by the embodiment of the present disclosure, the terminal generates the acknowledgment message in response to the first downlink data received, and acquires the channel resource occupancy priority of the acknowledgment message. The terminal transmits the acknowledgment message via the preset channel resource when the channel resource occupancy priority of the acknowledgment message is higher than the channel resource occupancy priority of the second downlink data. The second downlink data is data to be received by the terminal. It can be seen that, the terminal detects whether the channel resource occupancy priority of the acknowledgment message is higher than the channel resource occupancy priority of the second downlink data. The terminal transmits the acknowledgment message via the preset channel resource when the channel resource occupancy priority of the acknowledgment message is higher than the channel resource occupancy priority of the second downlink data, which can facilitate improving a speed of transmitting the ACK message, thereby alleviating a congestion of the network communication, reducing a probability of the AP retransmission, and improving a Wi-Fi download speed.

Figure 9B:
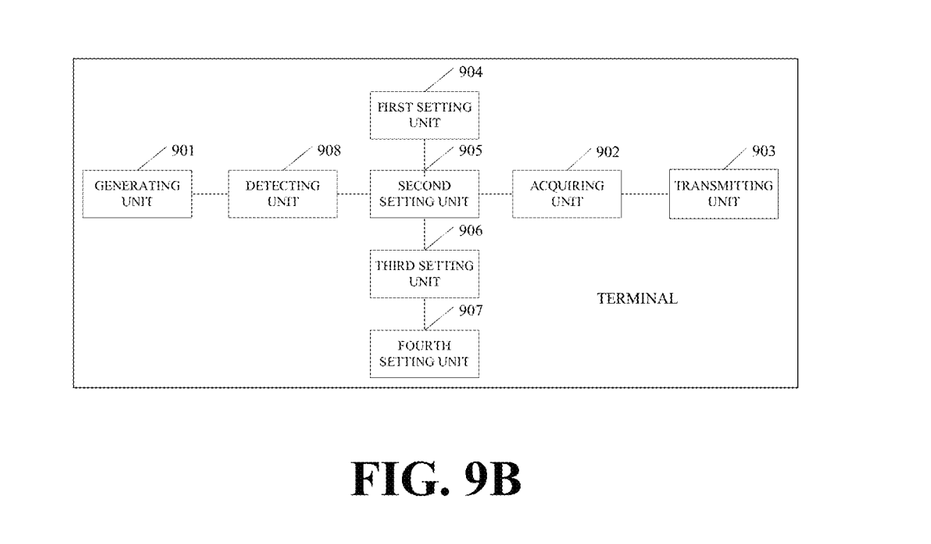
FIG. 9B is a block diagram illustrating a terminal according to an embodiment of the present disclosure.

As illustrated in FIG. 9B, a terminal can include the generating unit 901, the acquiring unit 902, and the transmitting unit 903 illustrated in FIG. 8-1. In the illustrated embodiment, the terminal can further include a detecting unit 908.

The detecting unit 908 is configured to detect whether the channel resource occupancy priority of the acknowledgment message is higher than the channel resource occupancy priority of the second downlink data.

In the illustrated embodiment, the terminal can further include a first setting unit 904.

The first setting unit 904 is configured to set the channel resource occupancy priority of the acknowledgment message to be higher than the channel resource occupancy priority of the second downlink data when a downlink-data-receiving speed of the terminal is higher than an uplink-data-transmitting speed of the terminal, after the generating unit 901 generates the acknowledgment message and prior to the acquiring unit 902 acquiring the channel resource occupancy priority of the acknowledgment message.

In the illustrated embodiment, the terminal can further include a second setting unit 905.

The second setting unit 905 is configured to set the channel resource occupancy priority of the acknowledgment message to be higher than the channel resource occupancy priority of the second downlink data when a difference value between a downlink-data-receiving speed of the terminal and an uplink-data-transmitting speed of the terminal is greater than or equal to a first preset threshold, after the generating unit 901 generates the acknowledgment message and prior to the acquiring unit 902 acquiring the channel resource occupancy priority of the acknowledgment message.

In the illustrated embodiment, the terminal can further include a third setting unit 906.

The third setting unit 906 is configured to set the channel resource occupancy priority of the acknowledgment message to be higher than the channel resource occupancy priority of the second downlink data when the amount of downlink data received by the terminal during a preset time period is greater than or equal to a second preset threshold, after the generating unit 901 generates the acknowledgment message and prior to the acquiring unit 902 acquiring the channel resource occupancy priority of the acknowledgment message.

In the illustrated embodiment, the terminal can further include a fourth setting unit 907.

The fourth setting unit 907 is configured to set the channel resource occupancy priority of the acknowledgment message to be higher than the channel resource occupancy priority of the second downlink data when the amount of uplink data transmitted by the terminal during a preset time period is less than or equal to a third preset threshold, after the generating unit 901 generates the acknowledgment message and prior to the acquiring unit 902 acquiring the channel resource occupancy priority of the acknowledgment message.

It is to be noted that, the terminal described in the apparatus embodiment of the disclosure is presented in the form of functional units. The term "unit" used herein should be understood as the broadest meaning as possible, and an object for implementing functions defined by each "unit" may be, for example, an application specific integrated circuit (ASIC), a single circuit, a processor (shared, dedicated, or chipset) and a memory for executing one or more software or firmware programs, a combinational logic circuit, and/or other suitable components that can achieve the above described functions.

Figure 10:
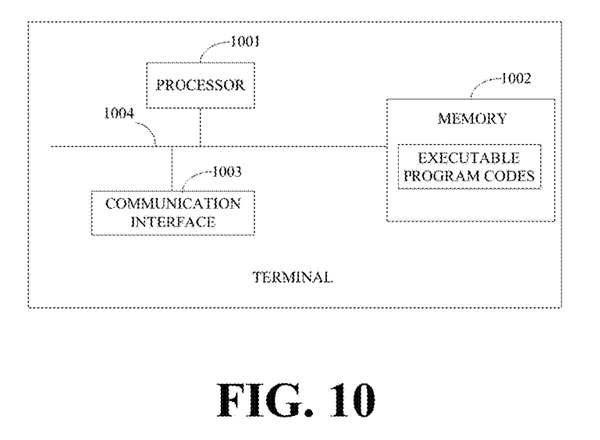
FIG. 10 is a schematic structural diagram illustrating a terminal according to an embodiment of the present disclosure.

In the illustrated embodiment, the function of the generating unit 901 which is generating the acknowledgment message for indicating successful data reception in response to first downlink data received by the terminal can be implemented by the terminal illustrated in FIG. 10. A processor 1001 can be configured to invoke executable program codes stored in a memory 1002 to generate the acknowledgment message when the first downlink data is successfully received by the terminal.

According to the terminal provided by the embodiment of the present disclosure, the terminal generates the acknowledgment message in response to the first downlink data received, and acquires the channel resource occupancy priority of the acknowledgment message. The terminal transmits the acknowledgment message via the preset channel resource when the channel resource occupancy priority of the acknowledgment message is higher than the channel resource occupancy priority of the second downlink data. The second downlink data is data to be received by the terminal. It can be seen that, the terminal detects whether the channel resource occupancy priority of the acknowledgment message is higher than the channel resource occupancy priority of the second downlink data. The terminal transmits the acknowledgment message via the preset channel resource when the channel resource occupancy priority of the acknowledgment message is higher than the channel resource occupancy priority of the second downlink data, which is beneficial to facilitating improving a speed of transmitting the ACK message, thus alleviating a congestion of the network communication, reducing a probability of the AP retransmission, and improving a Wi-Fi download speed.

An embodiment of the present disclosure further provides another terminal. As illustrated in FIG. 10, the terminal includes the processor 1001, the memory 1002, a communication interface 1003, and a communication bus 1004. The processor 1001, the memory 1002, and the communication interface 1003 are coupled through the communication bus 1004 to communicate with each other. The processor 1001 is configured to control a wireless communication with an external cellular network via the communication interface 1003. The communication interface 1003 includes, but is not limited to, an antenna, an amplifier, a transceiver, a coupler, a low noise amplifier (LNA), a duplexer, and the like. The memory 1002 includes at least one of a random-access memory (RAM), a non-volatile memory, and an external memory. The memory 1002 is configured to store executable program codes. The executable program codes are configured to direct the processor 1001 to perform the method for data transmission according to the embodiments of the present disclosure.

The processor 1001 is configured to generate an acknowledgment message for indicating successful data reception in response to first downlink data received; to transmit the acknowledgment message via a preset channel resource when the channel resource occupancy priority of the acknowledgment message is higher than a channel resource occupancy priority of second downlink data to be received by the terminal.

In the illustrated embodiment, the processor 1001 is further configured to set the channel resource occupancy priority of the acknowledgment message to be higher than the channel resource occupancy priority of the second downlink data.

In the illustrated embodiment, the processor 1001 configured to set the channel resource occupancy priority of the acknowledgment message to be higher than the channel resource occupancy priority of the second downlink data is further configured to set the channel resource occupancy priority of the acknowledgment message to be higher than the channel resource occupancy priority of the second downlink data, when a downlink-data-receiving speed of the terminal is higher than an uplink-data-transmitting speed of the terminal.

In the illustrated embodiment, the processor 1001 configured to set the channel resource occupancy priority of the acknowledgment message to be higher than the channel resource occupancy priority of the second downlink data is further configured to set the channel resource occupancy priority of the acknowledgment message to be higher than the channel resource occupancy priority of the second downlink data, when a difference value between a downlink-data-receiving speed of the terminal and an uplink-data-transmitting speed of the terminal is greater than or equal to a first preset threshold.

In the illustrated embodiment, the processor 1001 configured to set the channel resource occupancy priority of the acknowledgment message to be higher than the channel resource occupancy priority of the second downlink data is further configured to set the channel resource occupancy priority of the acknowledgment message to be higher than the channel resource occupancy priority of the second downlink data, when the amount of downlink data received by the terminal during a preset time period is greater than or equal to a second preset threshold.

In the illustrated embodiment, the processor 1001 configured to set the channel resource occupancy priority of the acknowledgment message to be higher than the channel resource occupancy priority of the second downlink data is further configured to set the channel resource occupancy priority of the acknowledgment message to be higher than the channel resource occupancy priority of the second downlink data, when the amount of uplink data transmitted by the terminal during a preset time period is less than or equal to a third preset threshold.

In the illustrated embodiment, the acknowledge message has at least one of characters of a small data volume, short transmitting time, and short channel resource occupancy time.

According to the terminal provided by the embodiment of the present disclosure, the terminal generates the acknowledgment message in response to the first downlink data received, and acquires the channel resource occupancy priority of the acknowledgment message. The terminal transmits the acknowledgment message via the preset channel resource when the channel resource occupancy priority of the acknowledgment message is higher than the channel resource occupancy priority of the second downlink data. The second downlink data is data to be received by the terminal. It can be seen that, the terminal detects whether the channel resource occupancy priority of the acknowledgment message is higher than the channel resource occupancy priority of the second downlink data. The terminal transmits the acknowledgment message via the preset channel resource when the channel resource occupancy priority of the acknowledgment message is higher than the channel resource occupancy priority of the second downlink data, thereby facilitating improving a speed of transmitting the ACK message, alleviating a congestion of the network communication, reducing a probability of the AP retransmission, and improving a Wi-Fi download speed.

Figure 11:
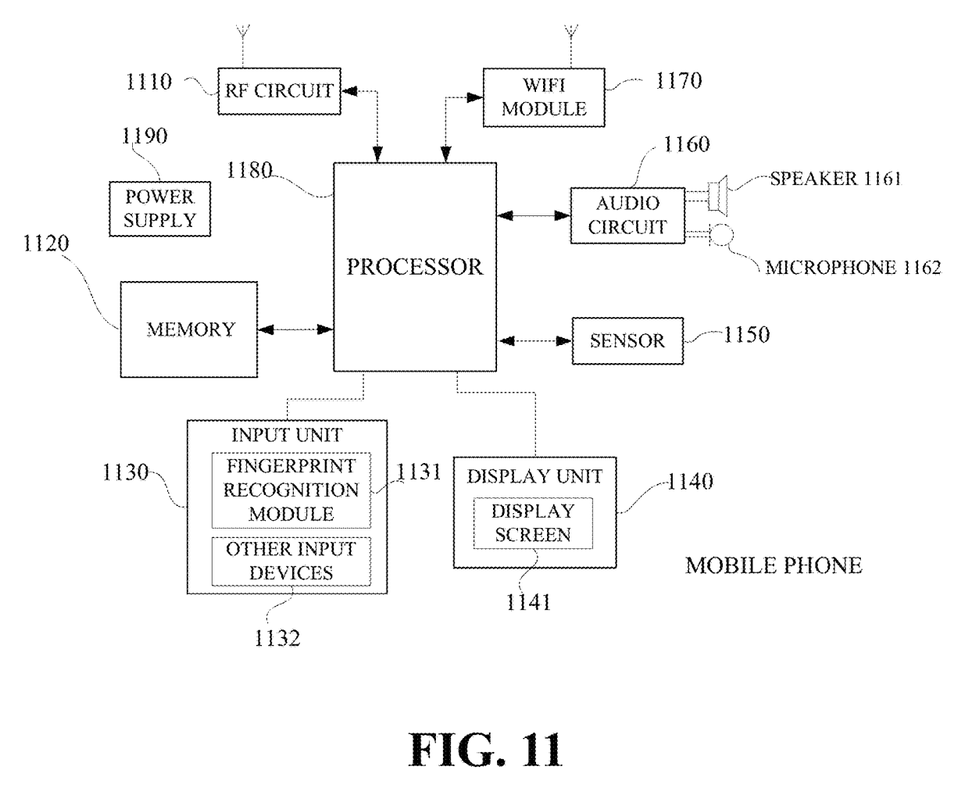
FIG. 11 is a schematic structural diagram illustrating another terminal according to another embodiment of the present disclosure.

Another terminal is provided according to an embodiment of the present disclosure. As illustrated in FIG. 11, only parts related to the embodiments of the present disclosure are illustrated for ease of description. For technical details not described, reference can be made to the method embodiments of the present disclosure. The terminal may be any terminal, such as a mobile phone, a tablet computer, a PDA, a point of sales (POS) terminal, an on-board computer, and the like. The following describes a mobile phone as an example of the terminal.

FIG. 11 is a schematic structural diagram of a part of a structure of a mobile phone related to a terminal according to an embodiment of the present disclosure. As illustrated in FIG. 11, the mobile phone includes a radio frequency (RF) circuit 1110, a memory 1120, an input unit 1130, a display unit 1140, a sensor 1150, an audio circuit 1160, a Wi-Fi module 1170, a processor 1180, a power supply 1190, and other components. Those skilled in the art can understand that the structure of the mobile phone illustrated in FIG. 11 does not constitute any limitation on a mobile phone. The mobile phone configured to implement technical solutions of the disclosure may include more or fewer components than illustrated or may combine certain components or different components.

In the following, various components of the mobile phone will be described in detail with reference to FIG. 11.

The RF circuit 1110 is configured to transmit or receive information. Generally, the RF circuit 1110 includes but is not limited to an antenna, at least one amplifier, a transceiver, a coupler, an LNA, a duplexer, and the like. In addition, the RF circuit 1110 can be further configured to communicate with the network and other devices via wireless communication. The above wireless communication may adopt any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 1120 is configured to store software programs and modules, and the processor 1180 is configured to execute various function applications and data processing of the mobile phone by running the software programs and the modules stored in the memory 1120. The memory 1120 can mainly include a program storage area and a data storage area. The program storage area may store an operating system, application programs required for at least one function, and so on. The data storage area may store data created according to use of the mobile phone, and so on. In addition, the memory 1120 may include a high-speed RAM, and may further include a non-volatile memory such as at least one disk storage device, a flash device, or other non-volatile solid storage devices.

The input unit 1130 may be configured to receive input digital or character information and to generate key signal input associated with user setting and function control of the mobile phone. In the illustrated embodiment, the input unit 1130 may include a fingerprint recognition module 1131 and other input devices 1132. The fingerprint recognition module 1131 can be configured to collect fingerprint data of the user. In the illustrated embodiment, the fingerprint recognition module 1131 can include an optical fingerprint module, a capacitive fingerprint module, and a radio frequency fingerprint module. The fingerprint recognition module 1131 may be a capacitive fingerprint recognition module, for example, and may include a sensing electrode (an abnormal sensing electrode and a normal sensing electrode), and a signal processing circuit (such as an amplifying circuit, a noise suppression circuit, and an analog digital converter (ADC) circuit, and the like) coupled with the sensing electrode. In addition to the fingerprint recognition module 1131, the input unit 1130 may further include other input devices 1132. In the illustrated embodiment, other input devices 1132 may include, but are not limited to, one or more of a physical keyboard, a function key (such as a volume control key, a switch key, etc.), a trackball, a mouse, a joystick, and the like.

The display unit 1140 is configured to display information input by the user or information provided for the user or various menus of the mobile phone. The display unit 1140 may include a display screen 1141, and alternatively, the display screen 1141 may be in the form of a liquid crystal display (LCD), an organic light-emitting diode (OLED), and so on. Although the fingerprint recognition module 1131 and the display screen 1141 are illustrated as two separate components in FIG. 11 to realize the input and output functions of the mobile phone, in some embodiments, the fingerprint recognition module 1131 may be integrated with the display screen 1141 to implement the input and output functions of the mobile phone.

The mobile phone may also include at least one sensor 1150, such as a light sensor, a motion sensor, and other sensors. In the illustrated embodiment, the light sensor may include an ambient light sensor and a proximity sensor, among which the ambient light sensor may adjust the brightness of the display screen 1141 according to ambient lights, and the proximity sensor may turn off the display screen 1141 and/or backlight when the mobile phone reaches nearby the ear. As a kind of motion sensor, the accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related applications (such as vertical and horizontal screen switch, related games, or magnetometer attitude calibration), or the accelerometer sensor can be used for vibration-recognition related functions (such as a pedometer, percussion), and so on. The mobile phone can also be equipped with a gyroscope, a barometer, a hygrometer, a thermometer, and infrared sensor, and other sensors, which will not be repeated herein.

The audio circuit 1160, the speaker 1161, the microphone 1162 can be configured to provide an audio interface between the user and the mobile phone. The audio circuit 1160 can be configured to convert the received audio data into electrical signals and transmit the electrical signals to the speaker 1161; thereafter the speaker 1161 is configured to convert the electrical signals into sound signals for output. On the other hand, the microphone 1162 is configured to convert the received sound signals into electrical signals, which will be received and converted into audio data by the audio circuit 1160 for output. The audio data is then processed and transmitted by the processor 1180 via the RF circuit 1110 to another mobile phone for example, or the audio data is output to the memory 1120 for further processing.

Wi-Fi belongs to a short-range wireless transmission technology. With aid of the Wi-Fi module 1170, the mobile phone may assist the user in E-mail receiving and sending, webpage browsing, access to streaming media, and the like. Wi-Fi provides users with wireless broadband Internet access. Although the Wi-Fi module 1170 is illustrated in FIG. 11, the Wi-Fi module 1170 is not essential to the mobile phone and can be omitted according to actual needs without departing from the essential nature of the present disclosure.

The processor 1180 is the control center of the mobile phone and is configured to connect various parts of the whole mobile phone through various interfaces and lines, run or execute software programs and/or modules stored in the memory 1120, and invoke data stored in the memory 1120 to perform various functions of the mobile phone and process data, thereby monitoring the mobile phone as a whole. In at least one illustrated embodiment, the processor 1180 may include one or more processing units. For example, the processor 1180 may integrate an application processor and a modem processor, where the application processor is configured to handle the operating system, the user interface, the application, and so on, and the modem processor is mainly configured to process wireless communication. It can be understood that the above-mentioned modem processor may not be integrated into the processor 1180.

The mobile phone also includes the power supply 1190 (e.g., a battery) that is configured to supply power to various components. For instance, the power supply 1190 may be logically connected to the processor 1180 via a power management system to achieve management of charging, discharging, and power consumption through the power management system.

Although not illustrated, the mobile phone may include a camera, a Bluetooth module, etc., which will not be elaborated herein.

The method of the foregoing embodiments illustrated in FIG. 2 to FIG. 8 can be realized based on the structure of the mobile phone.

The functions of the units illustrated in FIG. 9A and FIG. 9B can be achieved based on the structure of the mobile phone.

Embodiments of the present disclosure also provide a computer storage medium. The computer storage medium is configured to store computer programs which, when executed, are configured to execute all or part of the operations of any of the methods for data transmission described in the above-described method embodiments.

It is to be noted that, for the sake of simplicity, the foregoing method embodiments are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the embodiments described in the specification are exemplary embodiments and the actions and modules involved are not necessarily essential to the present disclosure.

In the foregoing embodiments, the description of each embodiment has its own emphasis. For the parts not described in detail in one embodiment, reference may be made to related descriptions in other embodiments.

In the embodiments of the disclosure, the apparatus disclosed in embodiments provided herein may be implemented in other manners. For example, the device/apparatus embodiments described above are merely illustrative; for instance, the division of the unit is only a logical function division and there can be other manners of division during actual embodiments, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the embodiments.

In addition, the functional units in various embodiments of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various embodiments of the present disclosure. The memory includes various medium capable of storing program codes, such as a universal serial bus (USB) flash disk, a read-only memory (ROM), a RAM, a removable hard disk, a disk, a compact disc (CD), or the like.

It will be understood by those of ordinary skill in the art that all or a part of the various methods of the embodiments described above may be accomplished by means of a program to instruct associated hardware, the program may be stored in a computer-readable memory, which may include a flash memory, a ROM, a RAM, a disk, a CD, and the like.

The embodiments of the present disclosure are described in detail above, and the principles and embodiments of the present disclosure are described herein by using specific embodiments. The description of the above embodiments is only for helping to understand the method and the technical solutions of the present disclosure. For those of ordinary skill in the art, there will be changes in specific embodiments and applications according to the idea of the present disclosure. In conclusion, the content of the specification should not be understood as limiting the disclosure.

What is claimed is:

1. A method for data transmission, comprising:
   generating an acknowledgment message for indicating successful data reception in response to first downlink data received by a terminal;
   transmitting the acknowledgment message via a preset channel resource, when a channel resource occupancy priority of the acknowledgment message is higher than a channel resource occupancy priority of second downlink data to be received by the terminal; and
   setting the channel resource occupancy priority of the acknowledgment message to be higher than the channel resource occupancy priority of the second downlink data when at least one of the following occurs:
      a downlink-data-receiving speed of the terminal is higher than an uplink-data-transmitting speed of the terminal;
      a difference value between a downlink-data-receiving speed of the terminal and an uplink-data-transmitting speed of the terminal is greater than or equal to a first preset threshold;
      an amount of downlink data received by the terminal during a preset time period is greater than or equal to a second preset threshold; or
      an amount of uplink data transmitted by the terminal during a preset time period is less than or equal to a third preset threshold.

2. The method of claim 1, wherein the acknowledge message has at least one of characters of a small data volume, short transmitting time, and short channel resource occupancy time.

3. A terminal, comprising:
   at least one processor; and
   a computer readable storage, coupled to the at least one processor and storing at least one computer executable instruction thereon which, when executed by the at least one processor, causes the at least one processor to carry out actions, comprising:
      generating an acknowledgment message for indicating successful data reception in response to first downlink data received by a terminal;
      transmitting the acknowledgment message via a preset channel resource, when a channel resource occupancy priority of the acknowledgment message is higher than a channel resource occupancy priority of second downlink data to be received by the terminal; and
      setting the channel resource occupancy priority of the acknowledgment message to be higher than the channel resource occupancy priority of the second downlink data when at least one of the following occurs:
         a downlink-data-receiving speed of the terminal is higher than an uplink-data-transmitting speed of the terminal;
         a difference value between a downlink-data-receiving speed of the terminal and an uplink-data-transmitting speed of the terminal is greater than or equal to a first preset threshold;
         an amount of downlink data received by the terminal during a preset time period is greater than or equal to a second preset threshold; or
         an amount of uplink data transmitted by the terminal during a preset time period is less than or equal to a third preset threshold.

4. The terminal of claim 3, wherein the acknowledge message has at least one of characters of a small data volume, short transmitting time, and short channel resource occupancy time.

5. A non-transitory computer-readable storage medium storing a computer program which, when executed by a processor, causes the processor to carry out actions, comprising:
   generating an acknowledgment message for indicating successful data reception in response to first downlink data received by a terminal;
   transmitting the acknowledgment message via a preset channel resource, when a channel resource occupancy priority of the acknowledgment message is higher than the channel resource occupancy priority of second downlink data to be received by the terminal; and
   setting the channel resource occupancy priority of the acknowledgment message to be higher than the channel resource occupancy priority of the second downlink data when at least one of the following occurs:
      a downlink-data-receiving speed of the terminal is higher than an uplink-data-transmitting speed of the terminal;

a difference value between a downlink-data-receiving speed of the terminal and an uplink-data-transmitting speed of the terminal is greater than or equal to a first preset threshold;

an amount of downlink data received by the terminal during a preset time period is greater than or equal to a second preset threshold; or an amount of uplink data transmitted by the terminal during a preset time period is less than or equal to a third preset threshold.

6. The non-transitory computer-readable storage medium of claim 5, wherein the acknowledge message has at least one of characters of a small data volume, short transmitting time, and short channel resource occupancy time.

* * * * *